May 13, 1930. F. G. LILJENROTH 1,758,448
METHOD OF PRODUCING AMMONIUM PHOSPHATE OR MIXED FERTILIZERS
CONTAINING AMMONIUM PHOSPHATE BY LEACHING OF RAW PHOSPHATE
Filed June 21, 1928
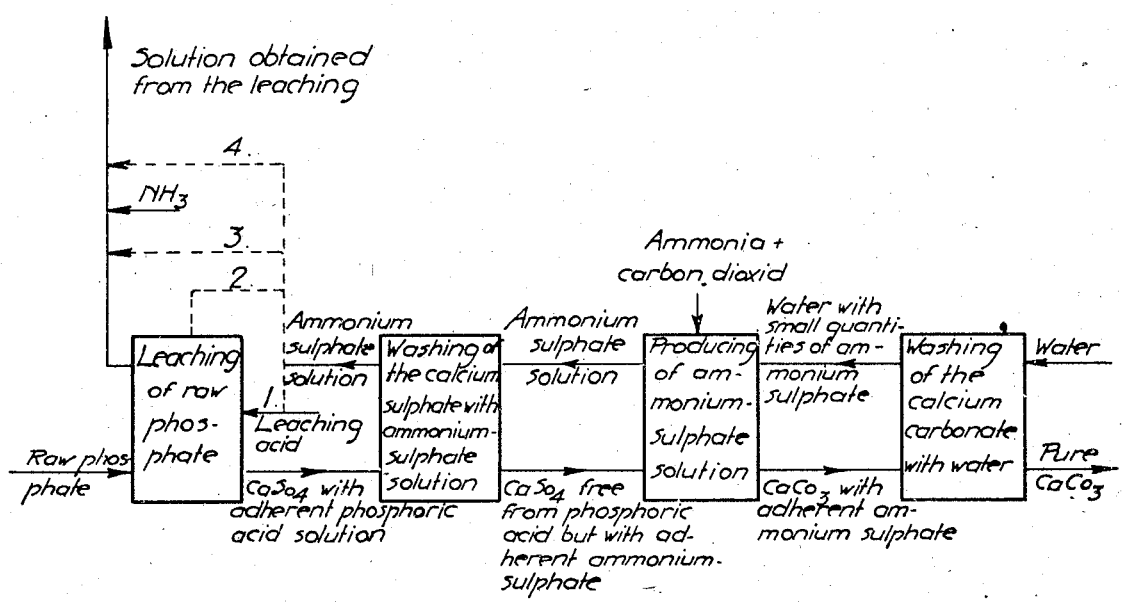
Inventor
Frans G. Liljenroth,
By Henry Orth
Atty.

Patented May 13, 1930

1,758,448

UNITED STATES PATENT OFFICE

FRANS GEORG LILJENROTH, OF STOCKHOLM, SWEDEN

METHOD OF PRODUCING AMMONIUM PHOSPHATE OR MIXED FERTILIZERS CONTAINING AMMONIUM PHOSPHATE BY LEACHING OF RAW PHOSPHATE

Application filed June 21, 1928, Serial No. 287,289, and in Sweden July 12, 1927.

It has been proposed to produce ammonium phosphate, limeless mixed fertilizers containing nitrogen, phosphoric acid and possibly potash with raw phosphate as raw material, the process being generally performed as follows:

Raw phosphate is leached with a suitable acid—for instance, sulphuric acid or nitric acid—if desired in deficit in relation to the lime of the raw phosphate, a solution of ammonium sulphate is added to the leaching acid, or in the leaching operation or to the solution obtained by the leaching and containing the phosphoric acid of the raw phosphate, the ammonium sulphate being wholly or party consumed to precipitate in the form of calcium sulphate the portion of the lime in the raw phosphate, which has not been precipitated, likewise in the form of calcium sulphate, by sulphuric acid which may be present in the leaching liquid.

It has also been proposed to utilize the calcium sulphate precipitated in the process to produce ammonium sulphate by reacting upon it by means of ammonia and carbon dioxide.

Such processes afford certain difficulties in technical realization. When calcium sulphate is separated from the solution containing the phosphoric acid a part of the solution adheres thereto the washing out of which causes dilution of the solution recovered and consequently an increase of the subsequent evaporation work or else, if not washed out, it is precipitated as insoluble calcium phosphate, when the ammonium sulphate is produced, and is thus lost. Furthermore, the phosphate thus precipitated is injurious to the calcium carbonate precipitated, if the latter is to be used for producing cement, lime, etc.

The object of this invention is to overcome said inconveniences by performing the production process in such a way that the required washings of precipitated insoluble products are effected by means of liquids, which in any case must be used in the process, it being in this way possible completely to avoid losses without any expensive dilution of the solutions produced. For such purpose the calcium sulphate precipitated is freed from adherent phosphoric acid by washing with the solution of ammonium sulphate produced. After washing, the calcium sulphate contains an adherent solution of ammonium sulphate instead of a phosphoric acid solution, but this does not imply any inconvenience, as the calcium sulphate washed is to be used for producing ammonium sulphate. The calcium carbonate precipitated in the last-mentioned production process is in its turn washed with pure water for the recovery of adherent ammonium sulphate solution and this water is then used for suspending further quantities of calcium sulphate in continuing the process. The ammonium sulphate solution produced from the calcium sulphate may after its use for the washing of the calcium sulphate either be evaporated alone, or be used as an addition to the leaching acid before or in the leaching, in which cases the comparatively large content of water in the solution is also utilized as a means of diluting the leaching acid or as a means of extracting the phosphoric acid, or else it may be added to the solution recovered by the leaching and containing the phosphoric acid of the raw phosphate after the separation of the calcium sulphate and before or after the neutralization of the solution.

As is evident from the above statements raw phosphate on one hand enters into the process and its content of lime is first transformed into calcium sulphate, which is purified from adherent phosphoric acid solution by washing with ammonium sulphate solution and then converted into calmium carbonate, which is freed from adherent ammonium sulphate solution by washing with pure water. The washing water on the other hand, proceeds in the opposite direction and firstly takes up ammonium sulphate from the calcium carbonate, then more ammonium sulphate at the conversion of the calcium sulphate and finally solution of phosphoric acid by the washing of the calcium sulphate precipitate obtained in the leaching and then the solution may in the one or the other way be mixed with the solution produced by the leaching. The process is diagrammatically illustrated in the annexed drawing, which is deemed to be quite clear from the text therein without further explanation. The Figures 1 to 4 indicate alternative modes of utilizing the ammonium sulphate solution after the washing of the calcium sulphate.

According to mode 1 the ammonium sulphate solution is added to the leaching acid and supplied to the leaching vessel in mixture with the acid. According to mode 2 the ammonium sulphate solution and the leaching acid are supplied to the leaching vessel independently of each other. In both cases the ammonium sulphate acts as a precipitant for the calcium which possibly goes in solution as soluble calcium salt by the action of the leaching acid. According to mode 3 the ammonium sulphate solution is used as an addition to the acid solution obtained by the leaching whereupon the mixture is neutralized by means of ammonia and then evaporated. According to mode 4 the acid solution obtained by the leaching is first neutralized by an addition of ammonia whereupon the ammonium sulphate solution is mixed therewith and the mixture is evaporated.

By the washing of the calcium sulphate precipitate with a solution of ammonium sulphate the advantage is also attained that a smaller quantity of calcium sulphate is dissolved than if the washing had been effected with pure water. It is important that as little as possible of the calcium sulphate is dissolved at this stage, as the calcium sulphate thus dissolved enters into the solution containing the phosphoric acid and causes a corresponding quantity of the phosphoric acid in the end product to be obtained in a citrate-soluble form but not in a water-soluble form. In order further to reduce the dissolving of the calcium sulphate in the washing operation an ammonium sulphate solution may be used which is more concentrated than that directly produced in the conversion of the calcium sulphate. This may be performed either by a previous evaporation of a part of the water of the ammonium sulphate solution or by dissolving more ammonium sulphate or some other salt, as for instance potassium chloride or potassium sulphate in the ammonium sulphate solution obtained in the manner described. The dissolving of a potassium salt in the ammonium sulphate solution is especially suitable when it is desired that the end product shall contain not only nitrogen and phosphoric acid but also potash.

By washing the calcium sulphate with a solution of ammonium sulphate the further advantage is obtained, that the subsequent conversion of the calcium sulphate by means of ammonia and carbon dioxide to calcium carbonate and ammonium sulphate results in a more concentrated solution of ammonium sulphate as compared with the result obtained when the calcium sulphate has been washed with water only, as the calcium sulphate in the former case is mixed with ammonium sulphate solution already before the reaction. Simultaneously or alternatively the advantage is obtained that a larger amount of pure water may be used for recovering the ammonium sulphate solution adhering to the calcium carbonate formed, thus minimizing the loss of ammonium sulphate.

*Example.*—In leaching a raw phosphate of normal composition with nitric acid in the presence of ammonium sulphate in sufficient quantity to precipitate the lime 1519 grams of insoluble substances were obtained per kilogram of the raw phosphate and of these insoluble constituents 1298 grams were $CaSO_4.2HO$. The ammonium sulphate was supplied as washing liquid in the form of a 40 per cent solution. The calcium sulphate and the other insoluble constituents, altogether 1519 grams, were obtained after the washing in the form of a mud, containing 1013 grams of 40 per cent ammonium sulphate solution. This mud was then reacted upon by means of ammonia and carbon dioxide in order to convert the calcium sulphate to calcium carbonate and ammonium sulphate. The calcium carbonate formed and the other insoluble constituents, altogether 976 grams, were separated and washed with water. This water, which after the washing contained ammonium sulphate, was used in the continuous process for diluting the calcium sulphate mud before reacting upon the latter with ammonia and carbon dioxide. As the end product a 40% solution of ammonium sulphate was desired, and therefore about 2046 grams of pure water could be introduced as washing water, which quantity was sufficient to recover the ammonium sulphate adhering to the calcium carbonate mud practically without any loss.

What I claim is:—

1. A method of producing soluble phosphates from phosphatic rock, which comprises leaching the crude phosphate with an acid solution, separating the lime content of the crude phosphate as calcium sulphate, washing the separated calcium sulphate with a solution of ammonium sulphate for recovering adherent solution of phosphoric acid, and then reacting upon the calcium sulphate by means of ammonia and carbon dioxide so as to produce a solution of ammonium sulphate adapted to be used in continuing the process.

2. A method of producing soluble phosphates from phosphatic rock, which comprises leaching the crude phosphate with an acid solution, precipitating the lime dissolved by means of ammonium sulphate, washing the precipitate of calcium sulphate with a solution of ammonium sulphate, said solution being then utilized as precipitating agent for the lime, and reacting upon the washed calcium sulphate by means of ammonia and carbon dioxide so as to precipitate calcium carbonate and produce a solution of ammonium sulphate adapted to be used in continuing the process.

3. A method of producing soluble phosphate from phosphatic rock, which comprises leaching the crude phosphate with an acid solution containing ammonium sulphate so as to dissolve the phosphoric acid and precipitate the lime of the crude phosphate as calcium sulphate, washing the precipitate of calcium sulphate with a solution of ammonium sulphate, said solution being then utilized as addition to the leaching liquid, and reacting upon the washed calcium sulphate by means of ammonia and carbon dioxide, so as to precipitate calcium carbonate and produce a solution of ammonium sulphate adapted to be used in continuing the process.

4. In a method of producing soluble phosphates in which the lime content of the crude phosphate is first precipitated as calcium sulphate, which is converted into calcium carbonate by reacting upon it by means of ammonia and carbon dioxide, the step which comprises washing the precipitate of calcium carbonate by means of water so as to recover adherent solution of ammonia sulphate and then utilizing the dilute solution of ammonium sulphate thus obtained as a suspending and dissolving means for the calcium sulphate in continuing the process.

5. A method of producing soluble phosphates from phosphate rock, which comprises leaching the crude phosphate with an acid solution, precipitating the lime dissolved by means of ammonium sulphate, washing the precipitate of calcium sulphate with a solution of ammonium sulphate for recovering adherent solution of phosphoric acid, reacting upon the washed calcium sulphate by means of ammonia and carbon dioxide so as to produce a solution of ammonium sulphate, concentrating said solution, and then utilizing it to wash further quantities of calcium sulphate in continuing the process.

6. A method of producing soluble phosphates from phosphatic rock, which comprises leaching the crude phosphate with an acid solution while precipitating the lime dissolved as calcium sulphate, washing the precipitate of calcium sulphate with a solution of ammonium sulphate, reacting upon the washed calcium sulphate by means of ammonia and carbon dioxide so as to produce a solution of ammonium sulphate, adding a potassium salt to said solution and then utilizing the solution to wash further quantities of calcium sulphate in continuing the process.

In testimony whereof I have signed my name.

FRANS GEORG LILJENROTH.